US011093839B2

(12) United States Patent
Shamma et al.

(10) Patent No.: US 11,093,839 B2
(45) Date of Patent: Aug. 17, 2021

(54) MEDIA OBJECT GROUPING AND CLASSIFICATION FOR PREDICTIVE ENHANCEMENT

(71) Applicant: FUJIFILM Business Innovation Corp., Tokyo (JP)

(72) Inventors: David Ayman Shamma, San Francisco, CA (US); Lyndon Kennedy, San Francisco, CA (US); Francine Chen, Menlo Park, CA (US); Yin-Ying Chen, Sunnyvale, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 741 days.

(21) Appl. No.: 15/953,299

(22) Filed: Apr. 13, 2018

(65) Prior Publication Data

US 2019/0318252 A1 Oct. 17, 2019

(51) Int. Cl.
*G06N 5/04* (2006.01)
*G06F 16/58* (2019.01)

(52) U.S. Cl.
CPC .......... *G06N 5/04* (2013.01); *G06F 16/5866* (2019.01)

(58) Field of Classification Search
None
See application file for complete search history.

(56) References Cited

U.S. PATENT DOCUMENTS

2005/0268279 A1* 12/2005 Paulsen .................... G06F 8/38
                                                                   717/110
2012/0082401 A1    4/2012 Berger et al.
2015/0204559 A1*  7/2015 Hoffberg ................. F24F 11/30
                                                                   700/278

OTHER PUBLICATIONS

Montage-effortless photo books, 2018 (accessed Feb. 27, 2018). https://www.montagebook.com/.
Photo book effects, 2018 (accessed Feb. 27, 2018). https://support.shutterfly.com/app/answers/detail/a_id/1543/~/photo-books%3A-effects.
Photo book embellishments & stickers, 2018 (accessed Feb. 27, 2018). https://blog.shutterfly.com/16191/photo-book-embellishments-stickers/.
Resnapl minute made photo books, 2018 (accessed Feb. 27, 2018). https://www.resnap.com/.
Simple Path, 2018 (accessed Feb. 27, 2018). https://www.shutterfly.com/photo-books/simple-path.
Dolcourt, Jessica "The best and worst photo-book-making sites for you" https://www.cnet.com/news/best-and-worst-photo-book-making-websites-for-you/.

(Continued)

*Primary Examiner* — Wilbert L Starks
(74) *Attorney, Agent, or Firm* — Procopio, Cory, Hargreaves & Savitch LLP

(57) ABSTRACT

A computer implemented method of grouping media objects is provided, as well as systems, interfaces and devices therefor. The method includes generating a group from the media objects based on a combination of a script of sequential events and an actor associated with one or more of the media objects in the script, segmenting the group into segments each including one or more of the media objects, based on clustering or classification, providing titling and captioning for the segments, and generating filter and annotation recommendations based on knowledge associations in the media objects, data, and the combination of the script and the actor, across the media objects of the group.

18 Claims, 7 Drawing Sheets

(56) References Cited

OTHER PUBLICATIONS

Huang, Ting-Hao et al., "Visual Storytelling", Proceedings of NAACL-HLT 2016, Jun. 12-17, 2016, pp. 1233-1239, San Diego, California.
Adobe Systems Inc. Adobe sensei technology. URL. https://www.adobe.com/sensei.html.
Perez, Sarah "Skype launches photo effects—sticker suggestions powered by machine learning" Nov. 8, 2017. hllps://techcrunch.com/2017/11/08/skype-launches-photo-effects-sticker-suggestions-powered-by-machine-learning/.
Sandhaus, P. et al. "From Usage to Annotation", WSM'09, Oct. 23, 2009, pp. 27-34, Beijing, China.
Stokes, Natasha "The best sites for creating beautiful photo books" Sep. 13, 2016, https://www.techlicious.com/tip/best-sites-for-creating-beautiful-photo-books/.

* cited by examiner

MEDIA OBJECT GROUPING AND CLASSIFICATION FOR PREDICTIVE ENHANCEMENT

BACKGROUND

Field

Aspects of the example implementations relate to methods, systems, and interfaces for determining a group of photos, and classifying the photos as a group, using pixel content and metadata. Further, methods, systems and interfaces are provided for informed shot selection, photo-group captioning, and recommendation of annotations such as stamps, emojis, photo books, or filters.

Related Art

In the related art, a user performs classification of electronic photos on an individual file by file basis. For example, when a person attends a wedding, he or she may use a camera or device to take photos of the event. After the wedding, the user may seek to create a collage, photo album, photo book or other output, in which a plurality of photos are collected and manually organized on a file by file basis.

However, the related art approach may have various problems and disadvantages. For example, not by way of limitation, the photos may be related to images that were captured and are associated with an event or a special occasion. Further, a user may individually perform adjustments on photos or stylize the photos. However, the user may not easily consider adjustments or stylization of an individual photo in the context of other photos in the group, by the related art approach of manual organization and manipulation.

SUMMARY

Aspects of the example implementations include a computer implemented method of grouping media objects, comprising generating a group from the media objects based on a combination of a script of sequential events and an actor associated with one or more of the media objects in the script, segmenting the group into segments, each including one or more of the media objects, based on clustering or classification, providing titling and captioning for the segments, and generating recommendations based on knowledge associations in the media objects, data, and the combination of the script and the actor, across the media objects of the group.

According to the aspects, the recommendations comprise at least one of the filter effect recommendations and annotation recommendations, and the recommendations are predictive based on data associated with a knowledge base.

Further, according to the aspects, the filter effect recommendations are based on the data including online feedback received from one or more other users.

Additionally, according to the aspects, the sticker recommendations are based on the data including information associated with the images.

Also, according to the aspects, the recommendations comprise one or more of a type, a location and a density of at least one of a sticker, a text box and an emoji.

According to the aspects, the generating the group further comprises basing the grouping on a layout of the actor and one or more other actors in the group of media objects.

Also provided is a non-transitory computer readable medium including a processor configured to execute instructions stored in a storage, an image capture device configured to capture one or more images, and generate media objects, and the image capture device including a processor and storage.

DETAILED DESCRIPTION

Figure 1:
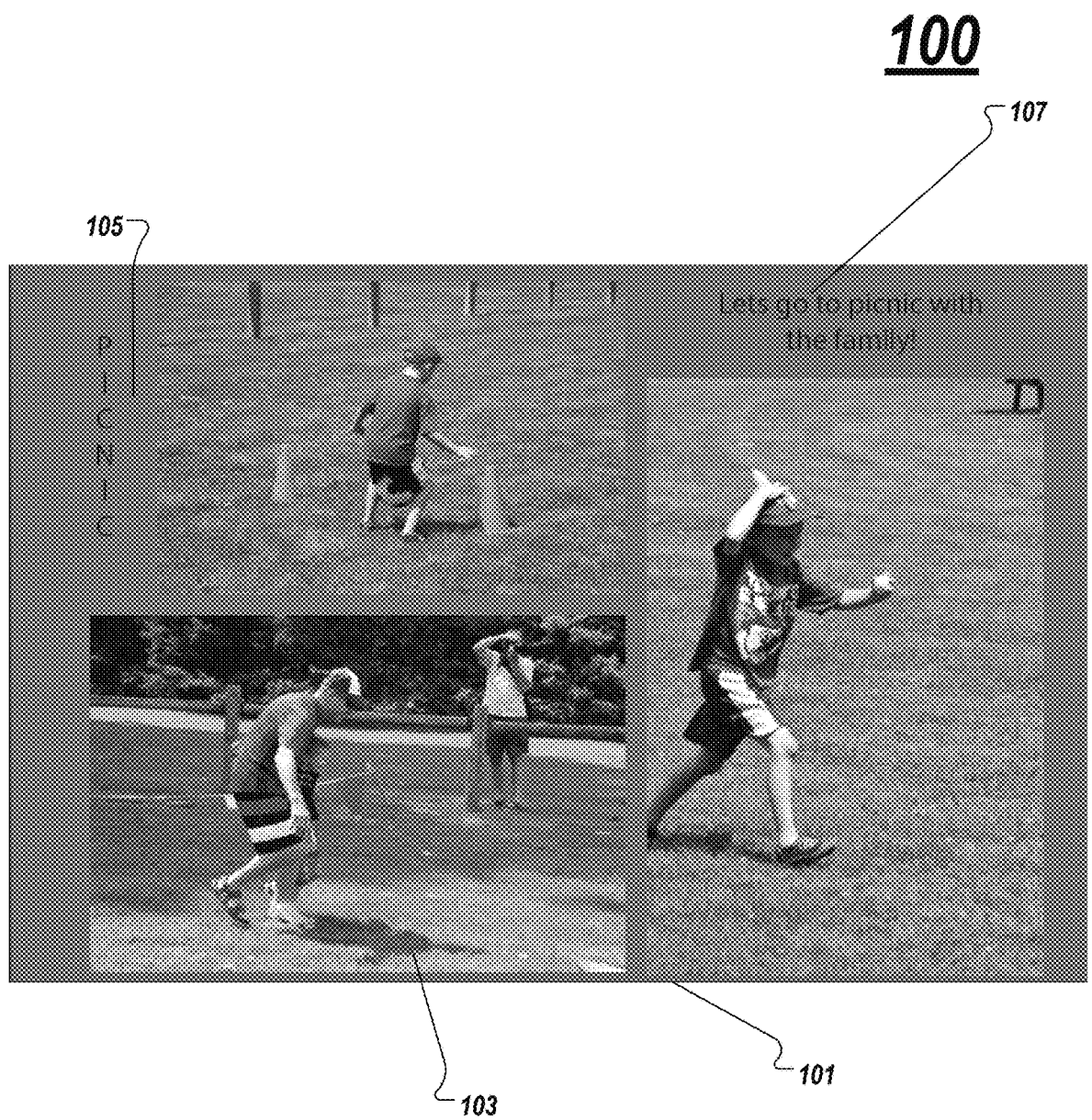
FIGS. 1 and 2 illustrate example outputs associated with the example implementations.

The following detailed description provides further details of the figures and example implementations of the present application. Reference numerals and descriptions of redundant elements between figures are omitted for clarity. Terms used throughout the description are provided as examples and are not intended to be limiting.

In the present application, the terms "image", "content media", "content media representation", or "media representation," may be used interchangeably to describe one or more of a photo, a video, a three-dimensional or 360° image recording, a drawing, painting, a sketch, a computer-generated image, or any other visual representation that may be produced, captured or may otherwise represent an event or occurrence in the real world. These terms may also include a recording or other audio representation that may be produced, captured, or may otherwise represent the event or occurrence in the real world. The "image", "content media", "content media representation", or "media representation" may be captured by any media capture device including, but not limited to, a camera, a digital recorder, analog recorder, mobile communications device, or any other media capture device that may be apparent to a person of ordinary skill in the art. The "content media", "content media representation", or "media representation" may be stored as a data file or other data structure on a computer readable medium including but not limited to a magnetic storage device, an optical storage device, a solid state storage device, an organic storage device or any other storage device that may be apparent to a person of ordinary skill in the art. Further, the computer readable medium may include a local storage device, a cloud-based storage device, a remotely located server, or any other storage device that may be apparent to a person of ordinary skill in the art.

Further, in the present application the terms "caption", "textual summary" "text summary" may all be used interchangeably to represent a descriptive text-based summary that may be representative of the content of one or more of the described "image", "content media", "content media representation", or "media representation."

Aspects of the example implementations are directed to classification of a group of media objects, for example but not by way of limitation, photos. More specifically, the group is provided as an input rather than a summing or concatenation of individual classifications. Accordingly, a top level domain is determined to classification. Based on the top level domain, a set of photos is selected and grouped into sequence clusters.

The top level domains may be provided programmatically in a deterministic manner or a rule-based approach. Alternatively, the top level domains may be learned from data, such as using existing artificial intelligence techniques such as machine learning, neural networks or the like. Accordingly, individual photos may be annotated by a user, based on a suggestion of annotations, which may include, but are not limited to, stamps, emojis, or text (e.g., balloon callout such as "Happy Birthday to me"). Similarly, photo filter effects may be applied.

For example but not by way of limitation, in the example usage of a birthday party, the collections of photos may include images of arriving at the venue, and meeting with each other, candles and a cake, and gifts associated with a complete or partial wrapping.

Example implementations may be directed to photo books. However, other applications may be substituted therefor, without departing from the inventive scope. Similarly, the sequence of photos may be processed at a remote storage and processing location, such as cloud, or may be processed at a user device or at the client side, such as a standalone camera, or mobile computing device such as a smart phone that includes an image capture device such as a camera. In such a scenario, appropriate metadata may be used, including, but not limited to, metadata associated with the photo exchangeable image file format (EXIF) data. Accordingly, the photos are "preprocessed" for further applications, such as photo printing, or for organizational software, online batch or social network sharing, or the like.

Figure 3:
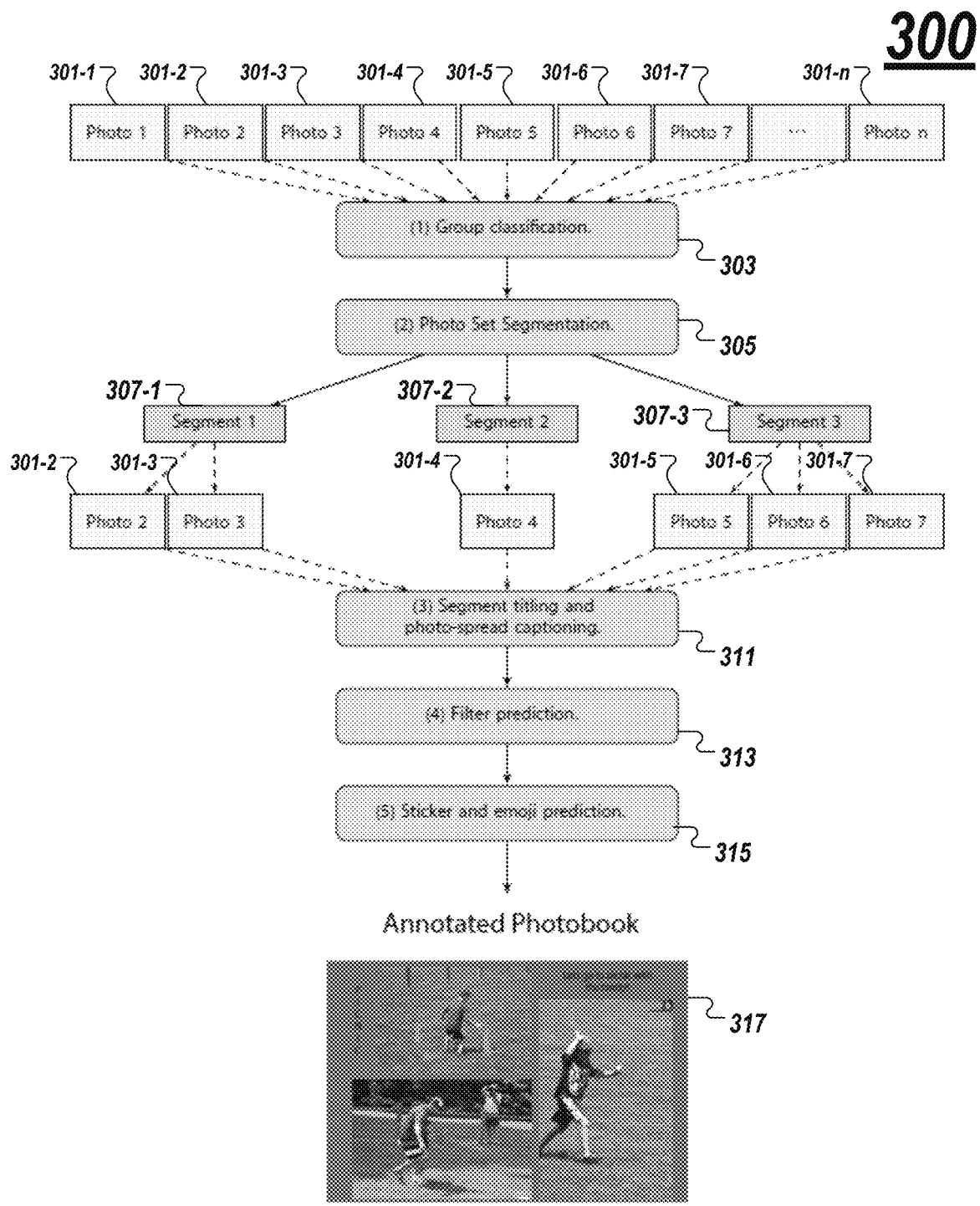
FIG. 3 illustrates a flow according to the example implementations.

FIG. 3 illustrates a flow 300 according to an example implementation. At an initial stage, media objects such as photos are captured. These photos are shown as Photo 1 . . . Photo n in FIG. 3.

The photos 301-1 . . . 301-n are classified as a batch at 303 (e.g., domain extraction). More specifically, a method is provided for classifying a parent level topic or theme, based on a selection of photos. For example, but not by way of limitation, a plurality of photos for a wedding venue or hall, a wedding dress, and people in suits may constitute a "wedding". Accordingly, a single classification is developed for the group, and only 1 of the 3 photos is indicated as "wedding".

For example, but not by way of limitation, the grouping may be performed by identifying a script for the event. Events may be defined that have standard timelines with a degree of variance. The events in the script are shown in a grouping, as determined by the system. For example, but not by way of limitation, in the script of a birthday, events may include pictures of presents, blowing candles, and other events associated with the script of a birthday party event. Alternatively, a wedding may be a script, and the two people who are getting married, an officiant, witness, etc. may be actors in the script. Certain types of actors may be pooled together, such as attendants, relation of guest to people who are getting married, etc.

The system would accordingly, once the event was determined to be a birthday party, search for photos associated with events of the timeline to generate the group. Using a script to determine the group provides diversity of photos across the various events of the script. The present system selects photos from the events so as to properly and proportionately represent events of the script in the group.

Optionally, a user may be provided with a list of events to choose from that comprise the scripts, to assist the system in performing the grouping. Thus, instead of grouping photos based on the face that is most dominant, or most highly represented, the photos are grouped based on the events of the script, and the roles of the actors in the script. Thus, for example, in the context of a wedding, a wedding photo book would have proportional representation of the various actors based on their roles, such that the people getting married would appear in more of the shots, as opposed to the attendant that appears most dominantly in the photos. Similarly, in the context of a birthday party, the grouping of photos include various events, such as opening of presents, blowing out of candles, sharing of balloons, eating cake, etc.

Additionally, actors in the group may be identified and used to determine photos for selection of the group. The actors may be persons who are known to be relevant to the script. For example, but not by way of limitation, in the context of a wedding script, the photo group should include a photo of the couple that is getting married, family members, close friends, etc.

For the identified script and actor, a relevance score may be determined. For example, but not by way of limitation, computer vision or other techniques may be used to analyze and classify the photos into the groupings. The foregoing identification of the scripting and actors may be performed by visual identification via computer vision. Accordingly, data (e.g., historical data) and training may be used to associate scripts and actors. Another approach may be to permit a user to manually generate labels. Further, with the authorization of one or more users, aggregation may be performed such that data and behavior analytics across users is aggregated or mixed. Further, subsets of the data may be developed or determined based on context, so that the domain model is tuned, as explained in greater detail below.

Further, a layout of each image is identified, by, for example, abstraction of the script/actor relationship, over iterations. The layout may provide a theme context creating a photo book. Further, users may be provided with an option to group photos having a similar layout over time, or in different locations. For example, but not by way of limitation, a photo of a child and parent in a prescribed standing or seating arrangement, may have their photo grouped over different geographic locations, or different time periods. For example, a grouping may be provided of family members in photo shots over the course of the year, and the generated group may be candidates of events in the script of a chronological year, for example for an annual holiday greeting card collage. Alternatively, pictures of family members captured at any regular event each year, such as sitting together in a similar manner at a birthday party or the like, may also be grouped.

Based on the above, a knowledge base is generated and used to identify the script and actors. Alternatively, the script and actors may be mined from provided data sets. Thus, photos are grouped.

While the foregoing example implementations described group determination after a user has completed the script, the example implementations are not limited thereto, and other scenarios may be envisioned by the inventive concept. For example, but not by way of limitation, the grouping may be determined in real time. In the context of a wedding, a user may use his or her mobile computing device to start taking pictures with the camera function. The camera may, using computer vision, determine based on the content of individual photos as well as the pattern and sequence of photos that are being taken, that the user is in a script, at a particular event stage. The system may then start adding metadata to the current photo, as well as prior photos that it determines to be associated with the script, all the way back to the initial photos of the script, as determined by the computer vision.

Accordingly, the example implementations provide for real time tagging photos and real-time creation of scripts, actors and layout. The collection of a single user may be merged with the collections and activities of other users, with permission, so as to generate an aggregated group across multiple users. In this scenario, the user may be provided with a degree of confidence that a script is of a certain type. For example, as the computer vision examines additional photos and the relationships between the photos, the application may determine that the script is of the type of, for example, a birthday party based on the presence of children singing, cake, etc.

If the online application is being used by a large number of users in aggregate, the grouping may be performed across multiple users, provide individual users with recommendations on which areas, actors, or aspects of photos should be taken. For example, if the online application determines that there are too many or too few photos of particular actors, the online application may recommend to one or more users to take photos of other actors. In the context of the birthday party example, if there are many photos of a person who is the main actor at the birthday party, and too few photos of a sibling or other relative, recommendations may be sent to certain attendants, optionally based on their role or relationship to the main actor, to suggest to take pictures of the siblings or the other relative.

Optionally, a user may be provided with an opportunity to define events associated with scripts. Further, a user may be provided with an opportunity to associate one or more actors with one or more scripts. Further, the user may be provided with an opportunity to request that the system perform pattern matching, such that the user suggests a script, and the system provides some suggested patterns of actors based on prior historical information. Further, generic templates of events associated with scripts and actors associated with scripts, as well as layouts, may also be provided to a user.

At 305, the batch is further segmented. More specifically, the group of photos may be segmented into subsets. The subsets may be generated based on temporal classification, such as clustering of photos in a stream of photos taken from one or more cameras. For example, but not by way of limitation, temporal clusters may be identified and generated. The photo subsets may also be built by group photo classification, applying the knowledge base determined in group classification 303.

As a result of the photos that have been segmented at 305, a plurality of segments 307-1, 307-2, 307-3 are generated, for example. Each of these segments may include one or more photos. For example, but not by way of limitation, segment 1 at 307-1 may include photo 2 and photo 3, 301-2 and 301-3, respectively; similarly segment 2 at 307-2 may include photo 4 at 301-4, and segment 3 at 307-3 may include photos 5, 6 and 7, at 301-5, 301-6 and 301-7, respectively. Accordingly, knowledge base generated by group classification 303 is segmented by photo set segmentation 305.

At 311, each segment is then titled, and groups of photos may optionally be titled. For example, each cluster may have a title generated, as well as an optional small caption relevant to the cluster. FIG. 1 illustrates an example output 100 with generated titles and captions. More specifically, a photo album 101 is provided that includes a plurality of photos such as 103. A title is shown at 105, and a caption is shown at 107. For example, as shown in FIG. 1, a title of "picnic" appears near the left, and the caption of "let's go to picnic with family" appears on the top right.

At 313, individual photos are analyzed for content and composition, and filter effect suggestions are provided. More specifically, the system is trained, based on how prior photos have been given effects, based on the historical data and/or context. For example, historical data may be analyzed, and a user may be provided with recommendations based on prior selection or behavior. In addition to standard adjustments that are recommended, the system is applied across the entire photo album, to ensure uniformity and consistency of the collection. For example, but not by way of limitation, the system may be trained on the effects that were applied to previous photos, based on social network information, such as a most popular effect or photo, or other feedback as would be understood by those skilled in the art. According to filter prediction 313, a user may perceive that the photo collection has been stylized in a manner that is appealing.

At 315, the system provides a suggestion of annotations, such as stickers (e.g., an annotation that includes an image, or an image and text, that may be customized), emojis (e.g., a small digital image or icon used to express an idea or emotion) or the like, for each individual photo. According to the example implementation, a number of contexts may be used as features. These contexts may include the automatically or manually identified photo book style, the actors on the current page and/or in a portion or the entirety of the photo book, the size of the face and the body of each actor, or other features as would be understood by those skilled in the art. Further, global features are provided for each sticker, such as a context of when the stickers have historically been used, and thus may be expected to be used by a user in the future. Accordingly, knowledge associations are used for making the recommendation.

The suggestion may be deterministic or rule-based (e.g., if a photo includes an image of a cat, then recommend to add a sticker of a mouse, or if a photo includes an image of a destination such as a famous tourist destination, then recommend a photo filter based on the destination). In an advertisement-based scenario, the suggestion may recommend a sticker associated with a brand, based on information in a photo (e.g., airline or travel company may recommend a sticker associated with its brand where an airport appears in a photo). The suggestion may also be determined by data-mining for well-known associations between objects in an image and filters or annotations (e.g., for a information including Humpty Dumpty, data mining of available online data would suggest recommending an annotation of an egg, a wall, or both). Alternatively, the recommendation may be based on historical information associated with the photo, or historical behavior for sticker recommendation associated with the photo.

Figure 2:
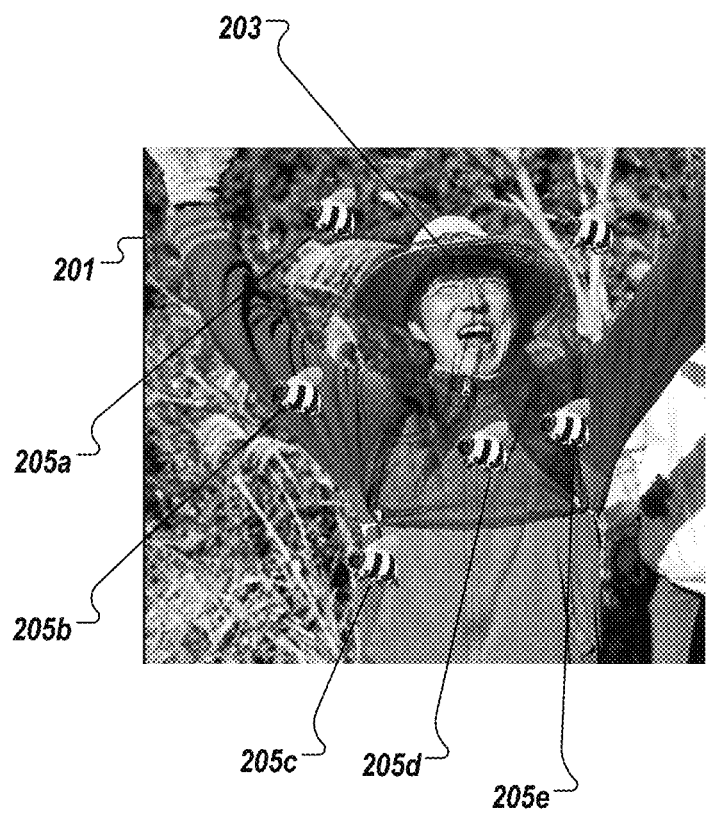

The foregoing features may be deterministically computed in an explicit manner. Alternatively the features may be implicitly learned by a model, for example employing machine learning or the like. Further, grouping of recommended stickers may also occur in certain contexts. FIG. 2 illustrates an example output 200 having results of recommended stickers. For example, in the image 201, a beekeeper 203 is in a photo. The system detects an association between the beekeeper 203 in the photo and the term "bee". Accordingly, a bee sticker is suggested. Because bees typically travel in groups or swarms, as determined by the system from a knowledge-based lookup, a plurality of the stickers 205a . . . 205e having a bee-like shape are suggested as an addition to the photo.

Optionally, a sticker recommendation may be associated with a specific location, such as a speech bubble associated with a mouth of a person in the photo, text associated with an article of clothing, glasses or the like. A knowledge base for the foregoing may be populated, either manually or by input of external information.

For example, but not by way of limitation, a user may perform a search for "<animal name> groups" and "<animal name> alone", to determine a context in which multiple stickers should be recommended. Objects in photos can be mapped to words, associations may be performed. In the example of FIG. 2, nearby words such as "high" or "bee keeper" may provide context or groupings.

An example output is shown at 317, as a collage. For example, the composite output may be a physical book, or embedded metadata where processing is performed on a device. In this example implementation, the user is provided with a photo book. In a first title "picnic" appears as a signpost for the photo spread, and secondly, "let's go to picnic with family" appears at the top right.

The example implementations described herein may have various benefits and advantages. For example, but not by way of limitation, while related art photo book generation applications may offer removal of images based on poor quality, such as blurriness, or exposure, as well as photo effects such as redeye reduction, and manual application of annotations, or auto correction to photos, these related art techniques are only performed at an individual photo level. The example implementations provide additional classification, segmentation, titling and captioning and provide the user with predictive recommendations for filtering and annotations based on grouping and segmentation. Additionally, the example implementations provide not just auto corrections based on photo parameters, but also provide stylistic filter effects, for photo sets.

In the forgoing example implementations, a user may also be provided with a degree of control over the recommendation settings. For example, a user may have settings or sliders indicative of a desired amount of annotation recommendations, such as more stickers, less stickers or no stickers. These settings may be provided at an account level, a photo album level, or may even be determined based on past user history, based on types of scripts, types of actors, layouts or other information as would be known to those skilled in the art.

In an example usage scenario, a user may have taken a plurality of photos over a period of time. For example, the user may have taken a very large number of photos over the course of the year, such as 10,000 photos. In the course of preparing a holiday greeting collage card, the user must select a limited number of images to be included in the collage. According to the example implementation, a grouping may be provided, possibly based on collages that were created manually in past years. For example, the script may include travel events over the course of the year represented in photos that contain family members, so as to create a travel based collage. Similarly, the user may be provided with template scripts, or may manually develop his or her own scripts, so as to create a group of photos. The user may also determine the size of the group of photos. For example, the user may select a travel related script, and request a group having a size of 50 photos, which the user can manually mix and match and further reduce, to the final number of photos desired on the collage. Optionally, the user may be provided filter and/or annotation options for the photos on the collage, as explained above described with respect to one and two. Alternatively, the user may select a dominant photo, and the system may generate a script based on the context of the photo and script, as well as the actors. Similarly, the foregoing layout element may also be included, so that the layouts of photos in prior collages may be maintained in the group. The annotations may also include captions.

Further, the system may generate groupings based on an intended target audience. Accordingly, in the forgoing example, the user may be provided with different groupings for different classes of target audiences. Thus, for family members, the grouping may include actors who are family members, and generate a group and relevant filtering and annotation recommendations for inclusion in a collage that is to be sent to family members based on the knowledge base, as explained above. Similar groupings may be performed for friends, coworkers, etc.

In addition to the foregoing example implementations associated with the grouping of scripts actors and layouts, further implementations may provide printed outputs or hard copies in conjunction with the forgoing example implementations. For example, but not by way of limitation, a user may provide plurality of photos stored to a kiosk, and the kiosk may provide suggested scripts, actors and/or layouts and generate a printout, such as photo book, holiday greeting card, collage, calendar, or other printed information associated with the grouping. Further, cameras may also include print capabilities that allow immediate printing of a subset of photos associated with the group, from a larger set of photos that were taken with the camera. Such an example implementation may be useful in the context of an event of a script, such as a table of guests at an event, where a camera is provided at the table for the table members to take photos.

Figure 4:
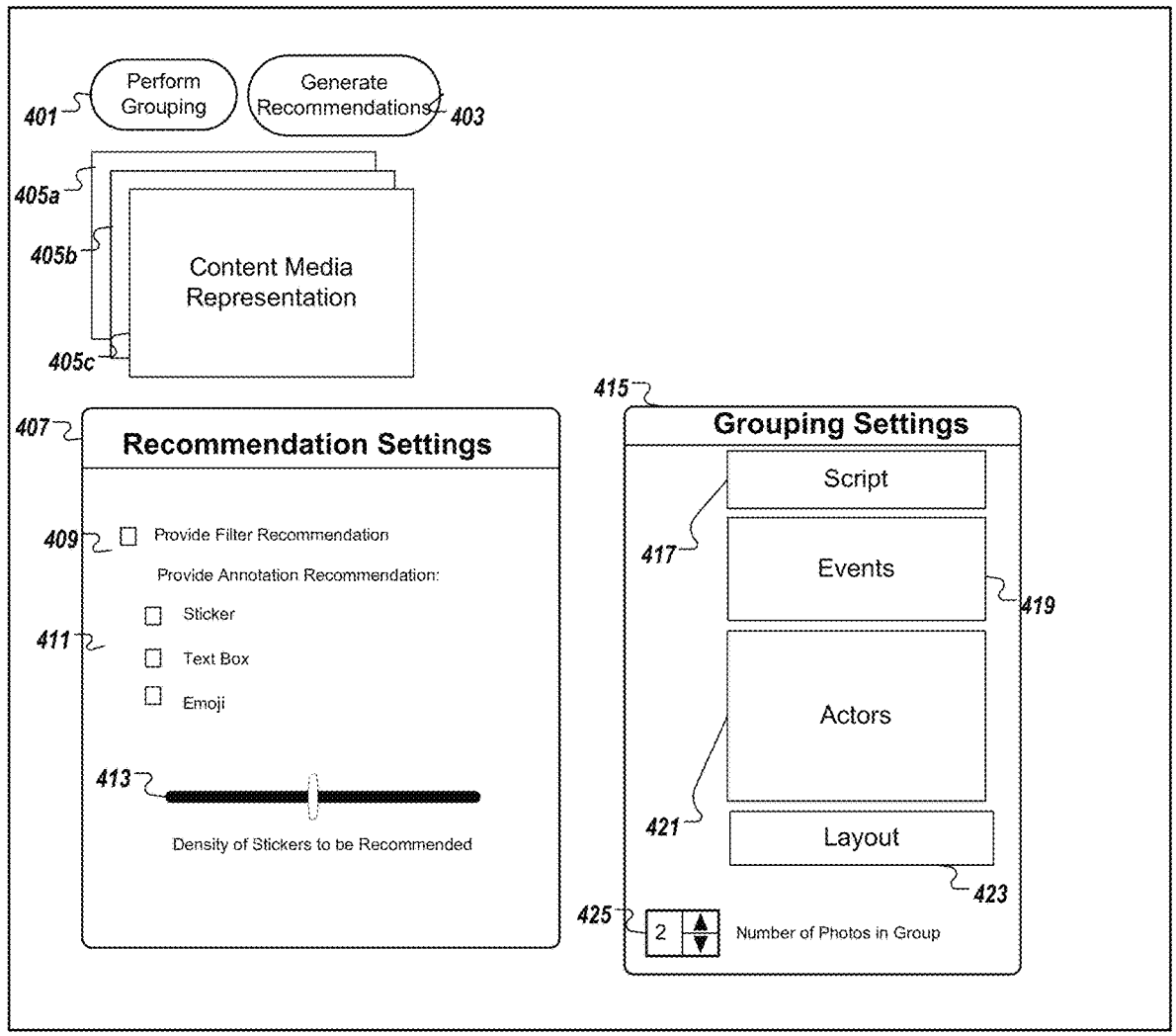
FIG. 4 illustrates an interface associated with the example implementations.

FIG. 4 illustrates an interface 400 in accordance with example implementations. This example interface is provided to illustrate how a user may control settings associated with grouping and recommendation. Other interfaces may be substituted for the example interface and additional interfaces may be provided to the user for control over settings, as well as organization and manipulation of the groups generated by the system, as would be understood by those skilled in the art.

In interface 400, the user may use buttons such as 401 to perform grouping, and 403 to generate recommendations. The photos may be shown in a summarized format as content media representation 405a, 405b, 405c. By selecting one or more of the content media, the user may be guided to an interface that shows a more detailed view of each of the photos in the generated group, and the user may be able to perform manual filtering and/or annotation, or implement recommendations provided by the system. From right to left, additional groups may be displayed, such that the user may manipulate or control one or more groups on a common interface.

Recommendation settings that a user may control are shown at 407. For example, but not by way of limitation, a user may be provided with an opportunity to select filter recommendations at 409. As a result, the user will be provided with filter recommendations for the photos in the group, as explained above. Alternatively, the user may elect to not receive filter recommendations and leave the box unchecked. Similarly, a user may be provided with one or more options for annotation recommendations, such as sticker, text box or emoji, at 411.

By selecting one or more of the boxes, the system will generate recommendations, as explained above, for a user to add annotations to one or more of the photos in the group. At 413, a slider is provided that permits the user to control annotation recommendation in a more granular manner. In this example interface, the user may control a density of stickers to be recommended on a prescribed photo. For example, some users prefer many stickers and other users prefer few or no stickers. By using this slider, a density of stickers is recommended by the system.

Grouping settings are provided to the user for control at 415. For example, the user may control the script at 417 by entering free-form text, keywords, or other information that describes the desired script. Alternatively, the system may recommend script for the selected photos 405*a*, 405*b*, 405*c*, and if the user does not accept the script as determined by the system based on the knowledge base and historical use, the user may provide a modification.

Additionally, events associated with the script may be listed at 419. Optionally, the user may enter additional events, delete events, change a description of events, or resequence events. As a result, the script and event combination generated by the system may be customized or modified by the user for the selected media. Similarly, at 421 actors associated with the script may also be described, and the user may add, remove, reorder the priority of, or change the description of the actors. At 423, a user may be provided with options to select a layout, as explained above.

With respect to the number of photos in the group, at 425 the user may control a number of photos in the group. As noted in the forgoing example implementations, such controls on the number of photos may permit a user to obtain a relatively small number of photos from a substantially large number of candidates, taking into account script, events, actors and optionally, layout, so as to produce a group of photos. Further, filter and annotation recommendations can be provided in a uniform manner for the photos in the group.

Figure 5:
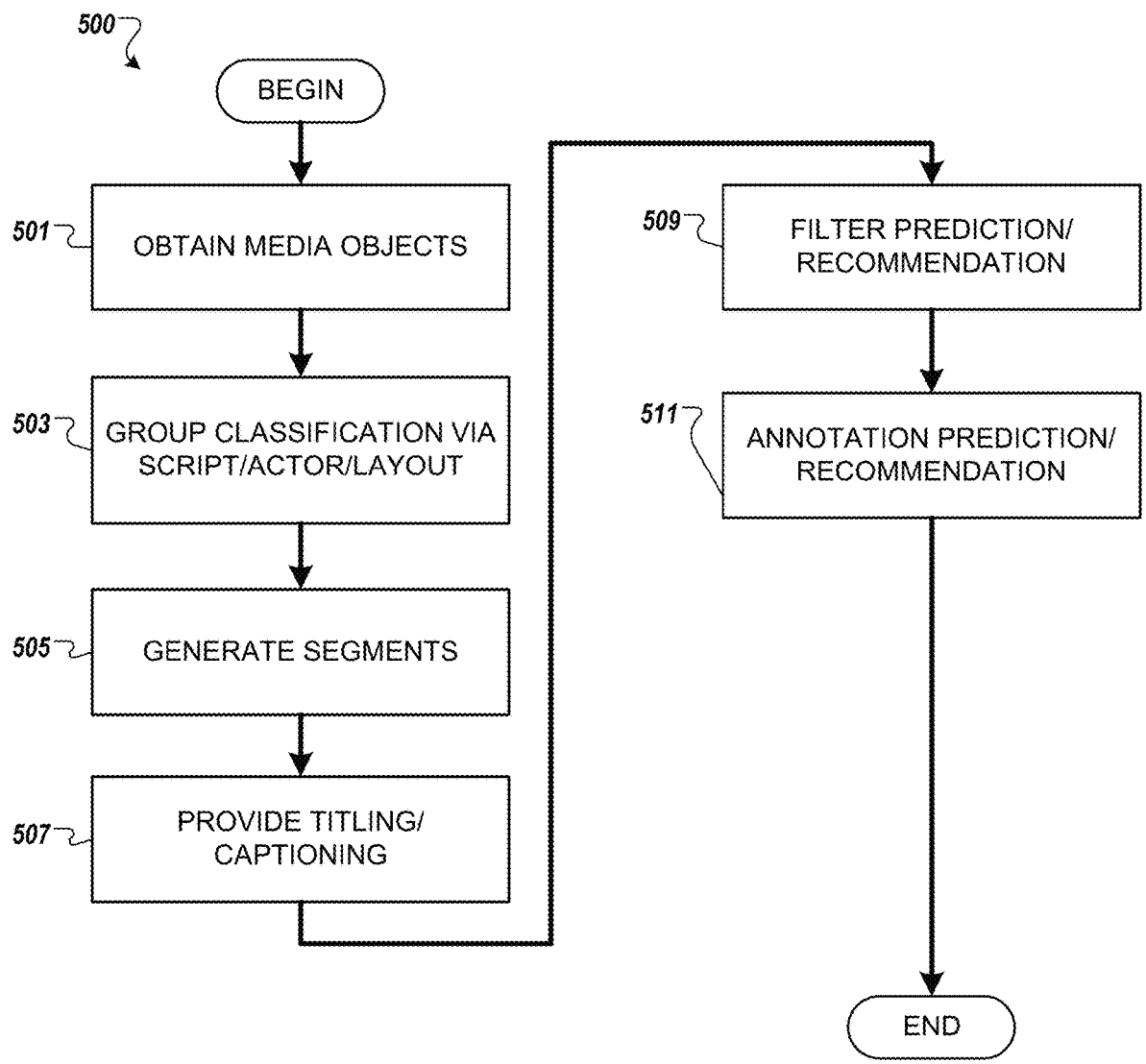
FIG. 5 illustrates a method in accordance with the example implementations.

FIG. 5 illustrates an example implementation of a method 500 according to the example implementations. Operations of the method 500 may be performed at the client side, server-side, or a combination thereof.

At 501, a plurality of media objects is obtained. For example, these objects may be obtained in real time by capturing of the images via a camera or other image capture device. Alternatively, the media objects may have been previously stored, either remotely or with the user, and available to a processor for further processing.

At 503, a grouping operation is performed, consistent with the foregoing disclosure in FIG. 3. More specifically, grouping is performed by classification based on script and actor, and optionally, layout. The script may be determined automatically by the system based on historical information previously acquired, current information in the process of being acquired, or other means such as cluster analysis. Accordingly, a knowledge base is generated that includes information on the script as well as the sequence of events associated with the script. Further, actors associated with events script may also be selected by the system. The script, events therein and actors may also be manually selected or modified by one or more users. Further, the script and actor information is applied to the obtained media objects from 501 to generate a group of objects that are associated with the script and actor/actors. Further, the grouping may optionally involve layout, such that visual configurations such as relationships between actors in a given event of a script, temporal relationships between prior layouts and the current layout, and relationships between prior layouts in the current layout for actors in one or more events of a script, may be used as a basis for the grouping, as performed automatically by the system, for example using computer vision.

At 505, segments are generated, as the knowledge base is segmented based on time and group classification, to generate segments, each of which contains one or more photos.

At 507, each cluster is provided with a title and caption relevant to the cluster, as explained above and illustrated in FIG. 1.

At 509, the above described prediction techniques are used to provide filter prediction with respect to photo effects, and provide recommendations to the user.

At 511, annotation recommendation is performed using the above described techniques, to predictively provide annotation recommendations to the user, such as for stickers or the like.

Figure 6:
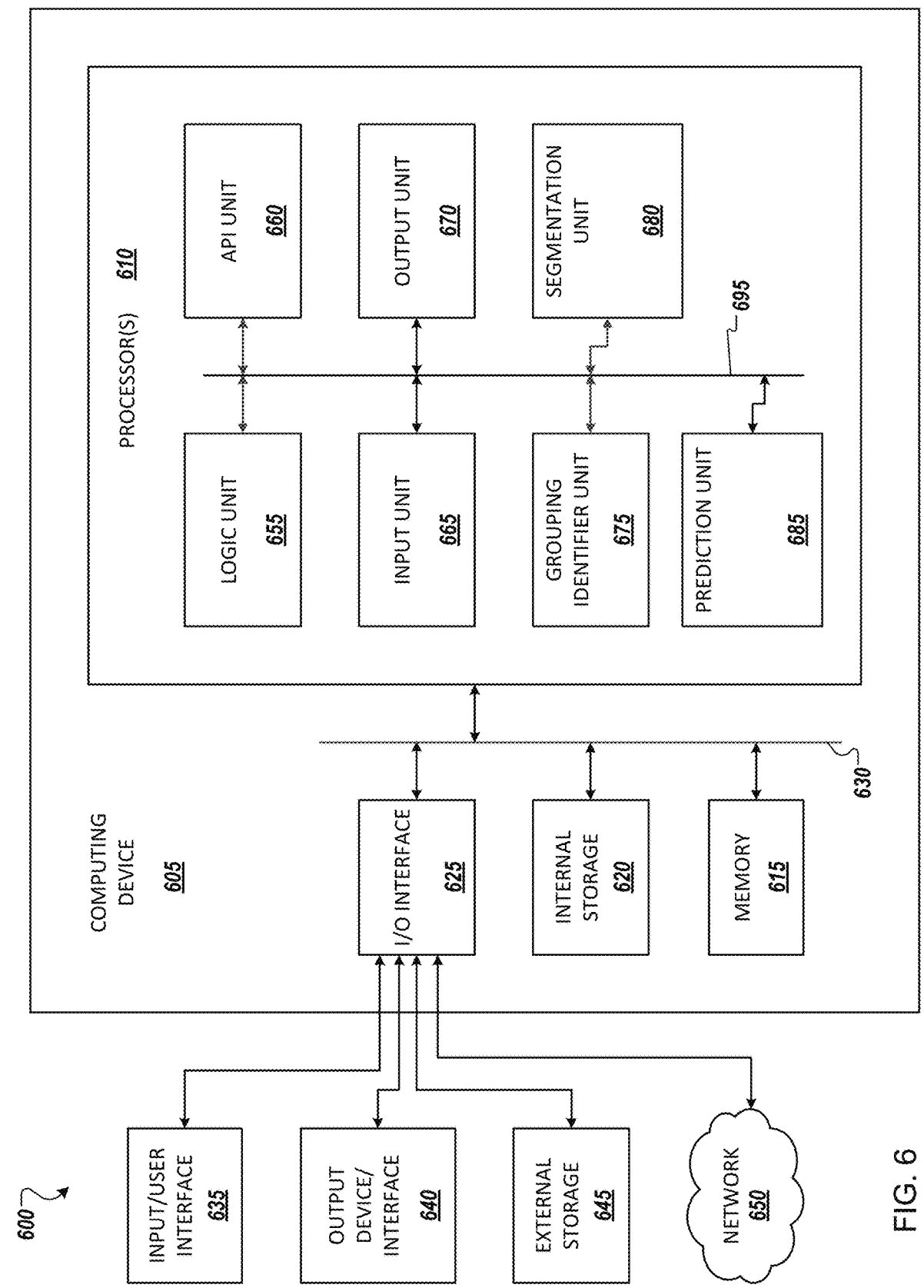
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605. These elements may include, but are not limited to, well-known AR hardware inputs so as to permit a user to interact with an AR environment.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, grouping identifier unit 675, segmentation unit 680, prediction unit 685, and inter-unit communication mechanism 695 for the different units to communicate with each other, with the OS, and with other applications (not shown).

For example, the grouping identifier unit 675, the segmentation unit 680, and the prediction unit 685 may implement one or more processes shown in FIGS. 3 and 5. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, grouping identifier unit 675, segmentation unit 680, and prediction unit 685). For example, the grouping identifier unit 675 may identify inputs such as cameras, and determine a grouping. The segmentation unit 680 may perform segmentation of the group into segments. Additionally, the prediction unit 685 may provide filter prediction and annotation prediction, and provide the user with one or more recommendations.

In some instances, the logic unit 655 may be configured to control the information flow among the units and direct the services provided by API unit 660, input unit 665, grouping identifier unit 675, segmentation unit 680, and prediction unit 685 in some example implementations described above. For example, the flow of one or more processes or implementations may be controlled by logic unit 655 alone or in conjunction with API unit 660.

Figure 7:
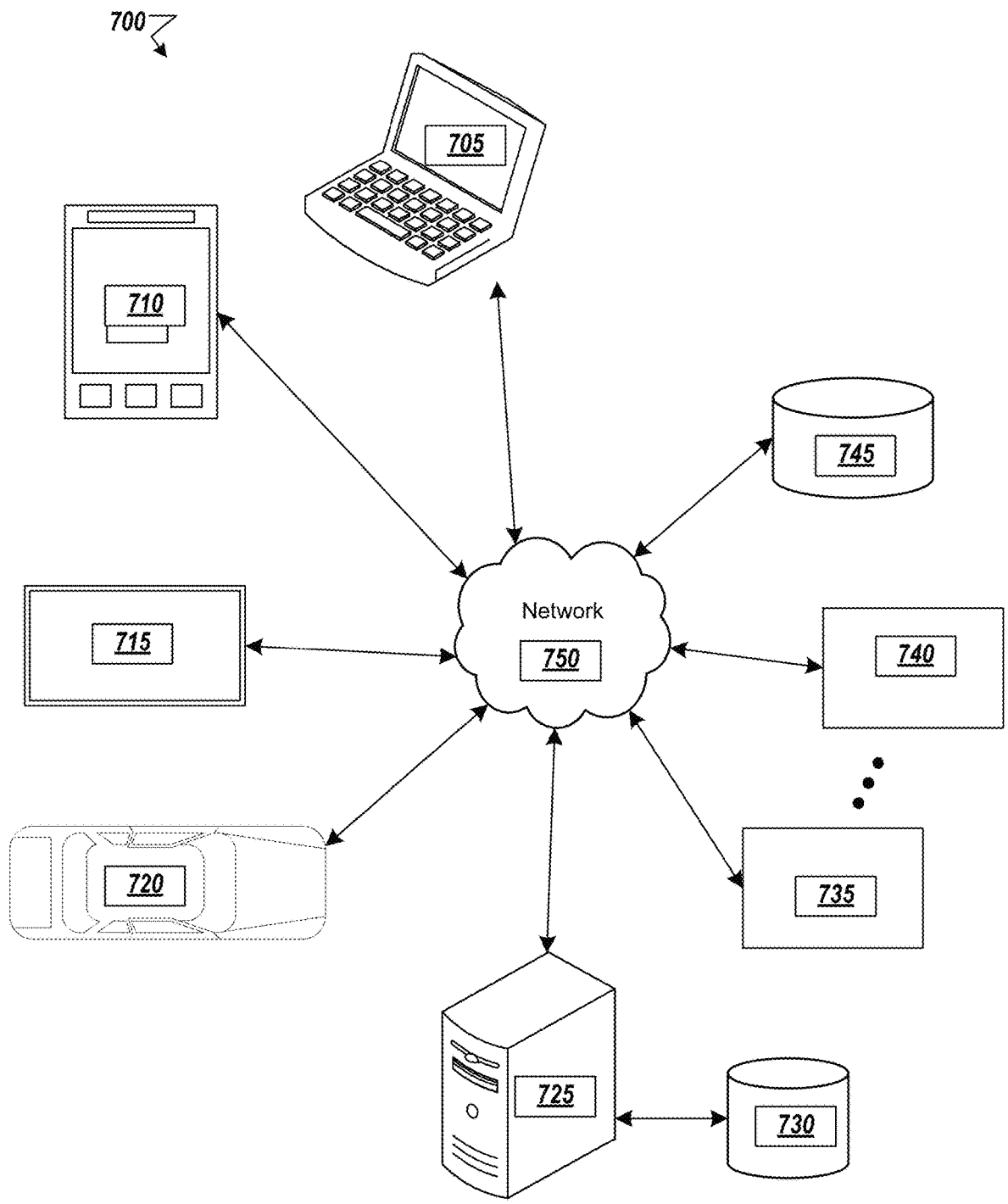
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745. The devices may be communicatively connected, including but not limited to AR peripherals that are well known in the art to permit a user to interact in AR, VR, mixed reality, or other environments. Further, the devices may include media object capture hardware, as would be understood by those skilled in the art.

In some implementations, devices 705-720 may be considered user devices associated with the users of the enterprise. Devices 725-745 may be devices associated with service providers (e.g., used by the external host to provide services as described above and with respect to the various drawings, and/or store data, such as webpages, text, text portions, images, image portions, audios, audio segments, videos, video segments, and/or information thereabout).

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer implemented method of grouping media objects, comprising:
   generating a group from the media objects based on a combination of a script of sequential events and an actor associated with one or more of the media objects in the script;
   segmenting the group into segments each including one or more of the media objects, based on clustering or classification;
   providing titling and captioning for the segments; and
   generating recommendations based on knowledge associations in the media objects, data, and the combination of the script and the actor, across the media objects of the group.

2. The computer implemented method of claim 1, wherein the recommendations comprise at least one of filter effect recommendations and sticker recommendations, and the recommendations are predictive based on data associated with a knowledge base.

3. The computer implemented method of claim 2, wherein the filter effect recommendations are based on the data including online feedback received from one or more other users.

4. The computer implemented method of claim 2, wherein the sticker recommendations are based on the data including information associated with the images.

5. The computer implemented method of claim 2, wherein the recommendations comprise one or more of a type, a location and a density of at least one of a sticker, a text box and an emoji.

6. The computer implemented method of claim 1, wherein the generating the group further comprises basing the grouping on a layout of the actor and one or more other actors in the group of media objects.

7. A non-transitory computer readable medium including a processor configured to execute instructions stored in a storage, the instructions comprising:
   generating a group from the media objects based on a combination of a script of sequential events and an actor associated with one or more of the media objects in the script;
   segmenting the group into segments each including one or more of the media objects, based on clustering or classification;
   providing titling and captioning for the segments; and
   generating recommendations based on knowledge associations in the media objects, data, and the combination of the script and the actor, across the media objects of the group.

8. The non-transitory computer readable medium of claim 7, wherein the recommendations comprise at least one of filter effect recommendations and annotation recommendations, and the recommendations are predictive based on data associated with a knowledge base.

9. The non-transitory computer readable medium of claim 8, wherein the filter effect recommendations are based on the data including online feedback received from one or more other users.

10. The non-transitory computer readable medium of claim 8, wherein the sticker recommendations are based on the data including information associated with the images.

11. The non-transitory computer readable medium of claim 8, wherein the recommendations comprise one or more of a type, a location and a density of at least one of a sticker, a text box and an emoji.

12. The non-transitory computer readable medium of claim 7, wherein the generating the group further comprises basing the grouping on a layout of the actor and one or more other actors in the group of media objects.

13. An image capture device configured to capture one or more images, and generate media objects, the image capture device including a processor and storage, the processor performing:
   generating a group from the media objects based on a combination of a script of sequential events and an actor associated with one or more of the media objects in the script;
   segmenting the group into segments each including one or more of the media objects, based on clustering or classification;
   providing titling and captioning for the segments; and
   generating recommendations based on knowledge associations in the media objects, data, and the combination of the script and the actor, across the media objects of the group.

14. The image capture device of claim 13, wherein the recommendations comprise at least one of filter effect recommendations and annotation recommendations, and the recommendations are predictive based on data associated with a knowledge base.

15. The image capture device of claim 14, wherein the filter effect recommendations are based on the data including online feedback received from one or more other users.

16. The image capture device of claim 14, wherein the sticker recommendations are based on the data including information associated with the images.

17. The image capture device of claim 13, wherein the recommendations comprise one or more of a type, a location and a density of at least one of a sticker, a text box and an emoji.

18. The image capture device of claim 13, wherein the generating the group further comprises basing the grouping on a layout of the actor and one or more other actors in the group of media objects.

* * * * *